United States Patent [19]

Rich et al.

[11] Patent Number: 4,646,198
[45] Date of Patent: Feb. 24, 1987

[54] MOLDED CASE CIRCUIT BREAKER MODULAR SUPPORT ASSEMBLY

[75] Inventors: Joseph F. Rich, New Britain; Robert J. Sabatella, Southington, both of Conn.; George L. Shuttleworth, Amsterdam, N.Y.

[73] Assignee: General Electric Company, New York, N.Y.

[21] Appl. No.: 802,347

[22] Filed: Nov. 27, 1985

[51] Int. Cl.$^4$ ............................................. H02B 1/04
[52] U.S. Cl. .................................. 361/346; 361/355; 361/363
[58] Field of Search ............... 174/148, 149 R, 149 B, 174/156; 200/293–296; 339/198 N, 22 B; 361/346, 353–356, 358, 361, 359, 363, 376

[56] References Cited

U.S. PATENT DOCUMENTS

| | | | |
|---|---|---|---|
| 3,278,807 | 2/1963 | Galante et al. | |
| 4,118,754 | 10/1978 | Duggan | 361/355 |
| 4,167,769 | 9/1979 | Luke et al. | 361/355 |
| 4,251,851 | 2/1981 | Diersing et al. | 361/363 |

Primary Examiner—G. P. Tolin
Attorney, Agent, or Firm—Richard A. Menelly; Walter C. Bernkopf; Fred Jacob

[57] ABSTRACT

A modular molded plastic circuit breaker and power bus support carries a plurality of integrally formed circuit breaker support hooks and power bus support posts on a common thermoplastic saddle for automated assembly. Means are formed at one end of the saddle for receiving modular extension saddles to accommodate circuit breaker load centers and panel boards of varying length during the automated assembly process.

9 Claims, 4 Drawing Figures

MOLDED CASE CIRCUIT BREAKER MODULAR SUPPORT ASSEMBLY

BACKGROUND OF THE INVENTION

The advent of structural thermoplastic materials having good heat and electrical resistive properties has resulted in the use of such materials as circuit breaker and power bus support saddles hereafter referred to as "saddles". Such plastic molded saddles having means integrally formed for supporting the circuit breakers as well as the main bus conductors and neutral bus connectors are already known. It is also known to interconnect several individual modular saddles to accomplish circuit breaker load centers and panel boards of adjustable length. The molded thermoplastic support saddles currently available require angular mounting of the neutral bus connectors within integrally formed supports. The angular loading requirement has heretofore deterred completely automated production because of the difficulties involved with robotic assembly when such neutral bus conductors must be angularly mounted.

A further hindrance to automated circuit breaker load center and panel board manufacture is the requirement that the modular auxiliary plastic saddles used for extending the length of such load centers and panel boards be interconnected with the main plastic saddle by means of a horizontal sliding procedure that is likewise difficult to automate. One example of an automatable lighting panel board assembly is shown in U.S. patent application Ser. No. 705,454, filed Feb. 25, 1985 and entitled "Lighting Circuit Breaker Panel Board Modular Assembly". This Application is incorporated herein for reference purposes and should be reviewed for its description of the materials used to form the molded plastic saddle. One purpose of the instant invention therefore is to provide an automated circuit breaker load center and panel board assembly wherein the main bus conductors and neutral bus conductors are "downloaded" onto the plastic saddle in the vertical plane for ease in robotic assembly. A further purpose is to provide modular auxiliary circuit breaker and power bus supports that can be interconnected by means of a down-loaded operation for robotic assembly.

SUMMARY OF THE INVENTION

The invention comprises a molded thermoplastic circuit breaker and power bus support saddle having means integrally formed therein for receiving the main bus and neutral bus conductors in a down-loaded process. Means are provided on the support for accepting one or more auxiliary thermoplastic extension modules to provide such circuit breaker and power bus support saddles of varying length without interfering with the speed of automated assembly.

DESCRIPTION OF THE PREFERRED EMBODIMENT

Figure 1:
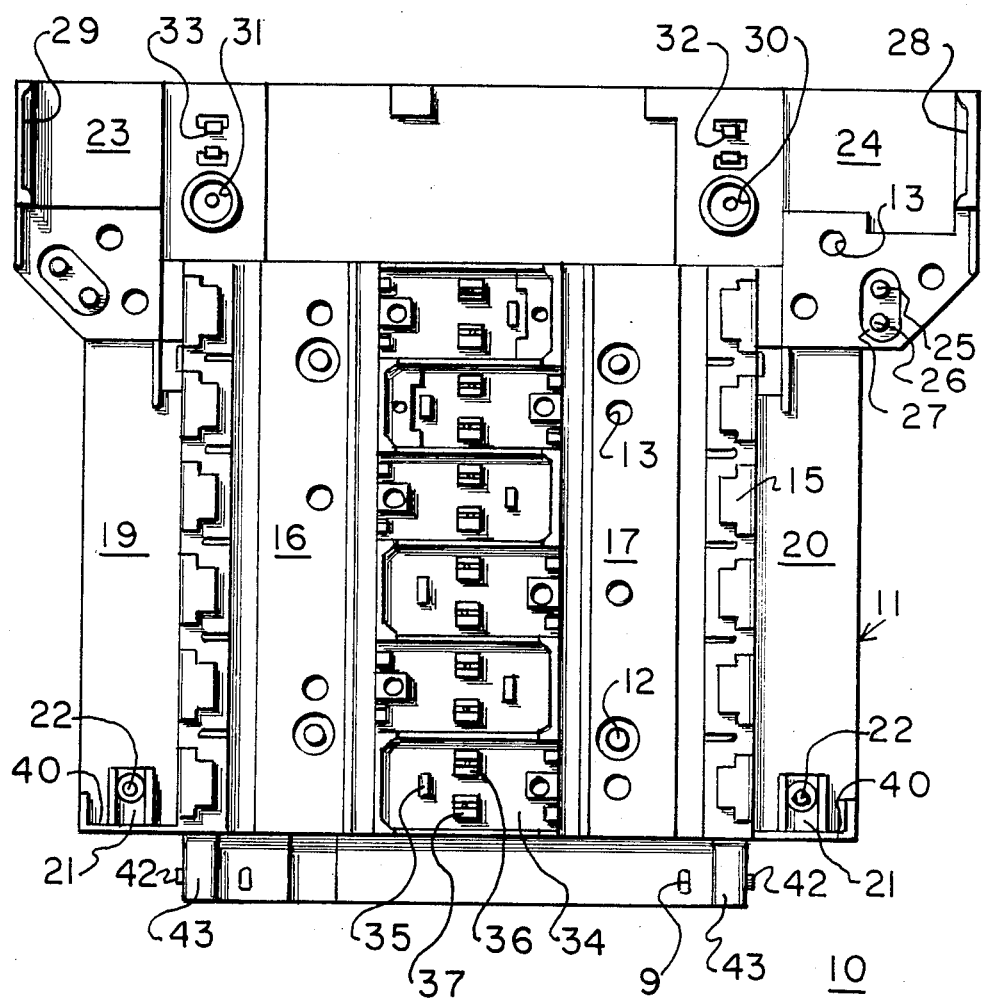
FIG. 1 is a plan view of the molded plastic support saddle according to the invention.

A circuit breaker and power bus support saddle 10 hereafter "saddle", is shown in FIG. 1 to consist of a thermoplastic support 11 having a plurality of posts 12 integrally formed therein for supporting the main power busses on the inner planar parallel surfaces 16 and 17. A plurality of circular recesses 13 are integrally formed within the bottom of the support for providing insulation between the bottom of the screws used to attach the circuit breaker contact stabs to the main power bus. A plurality of circuit breaker branch strap support platforms 34 having circuit breaker stab support posts 36, 37 and a stop 35 integrally formed therein extend upward from the support platform. A plurality of circuit breaker support hooks 15 are formed next to each inner planar parallel surface 16, 17 to support the circuit breakers when loaded on to the plastic saddle. Planar surfaces 19 and 20 outboard the inner planar parallel surfaces 16, 17 provide support to the neutral bus connector terminals when supported thereon by means of support posts 22 and pedestals 21 integrally formed at one end of the outboard planar parallel surfaces. A raised end barrier 40 is formed upright from these surfaces to electrically insulate the neutral conductor terminals from other electrical components within the circuit breaker load center or panel board enclosure. Tubular extension members 30, 31 are formed at one end of the circuit breaker support hooks to electrically shield the support screws which are used to hold the saddle to the load center or panel board support pan (not shown). A pair of split posts 32, 33 are integrally formed next to the tubular extensions for receiving a main circuit breaker modular adapter which may optionally be connected to the main saddle for use within some electrical installations. The relative height of the raised insulating barriers 28, 29 formed on opposite sides of the support with respect to the circuit breaker hooks 15 and the raised end barriers 40 can be seen by referring now to FIG. 2. The outer planar parallel surfaces 20 provide support for the neutral terminal connectors when arranged thereon and supported at their ends by means of the pedestal 21 and post 22 formed at one end and by means of support posts 25, 26 formed at an opposite end. Reinforcing ribs 41 extend across the bottom of the saddle to provide additional structural support and the circular recesses 13 extend from the bottom to provide electrical isolation between the screws used to hold the circuit breaker stabs to the power busses as well as to provide spacing between the saddle and the load center or panel board enclosure, or a metal mounting pan used therein. The saddle is attached to the enclosure by means of screws inserted through the slots 9 and through the holes in the tubular extension members 30 and 31. A projection 42 on one side of each of the two inverted U-shaped rails 43 which extend from one end of the support tightly engages a complimentary slot 65,66 formed on a modular extension saddle 44 hereafter "extension module" best seen by referring now to FIG. 3 to further increase the length of the saddle.

Figure 3:
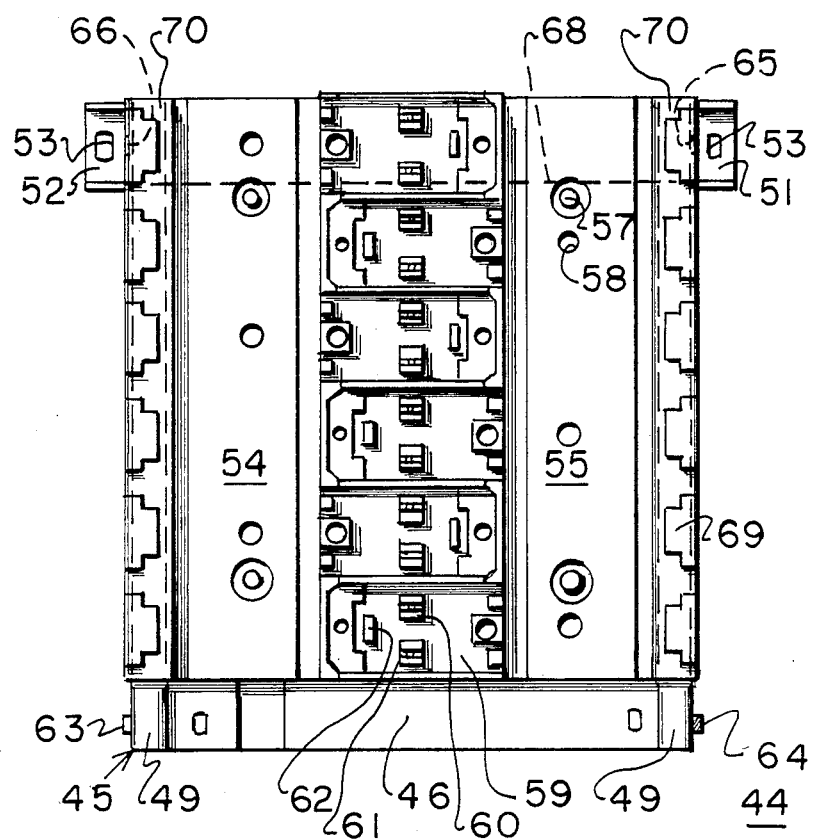
FIG. 3 is a plan view of a modular auxiliary support saddle for connecting with the bus support saddle of FIGS. 1 and 2.
Figure 4:
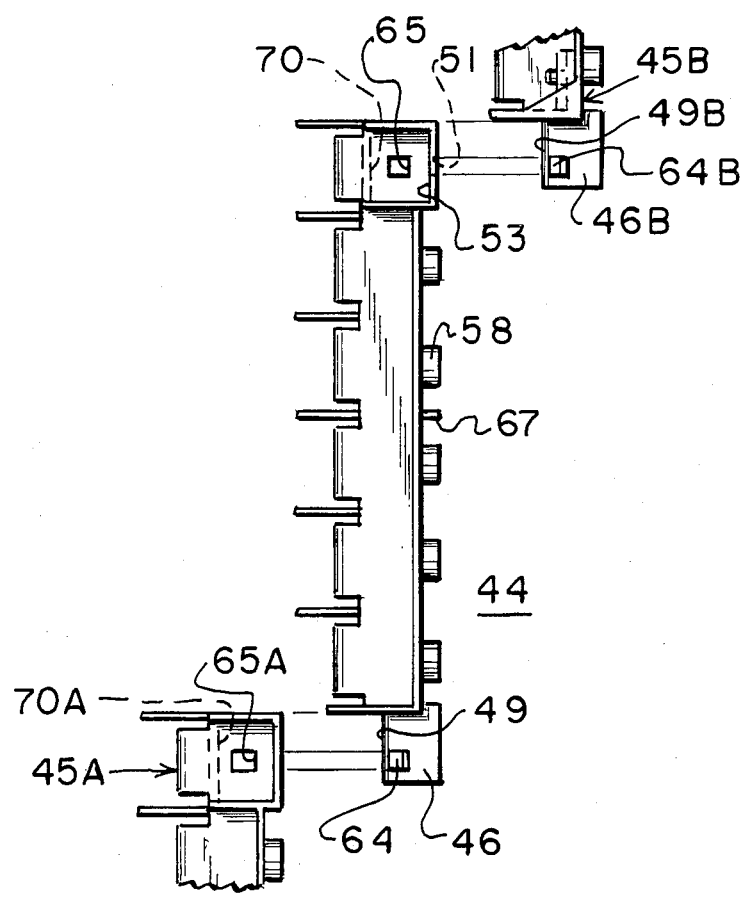
FIG. 4 is a side view of the modular auxiliary support saddle depicted in FIG. 3.

The extension module is similar to the plastic saddle 10, described earlier in that both are formed from a thermoplastic material within an injection molding process. A plastic module support 45 contains an integrally molded step 46 at one end for mating with a recessed area 68 of a similar extension module when more than one extension module is required. The two inverted U-shaped rails 49 which extend from the end 46 of the support 45 proximate the end of the circuit breaker support hooks 69 receive similar inverted U-shaped rails 70 which are part of the opposite end 68. When an additional extension module is attached by placement of a complimentary additional end 68 (not shown) over step 46 in a downward motion defined as the vertical plane in FIG. 3, the inverted U-shaped rails 70 overlap the inverted U-shaped rails 49 and the projections 63, 64 formed on the sides of the rails snappingly engage complimentary slots 65, 66 formed in the sides of the rails 70. The plastic saddle expansion facility by the use of slots 65, 66 and projections 63, 64 at opposite ends of the module can be seen by referring now to FIG. 4 wherein a similar module support 45A is shown positioned above step 46 at one end for down-loading rail 70A over rail 49 such that the slot 65A in rail 70A snappingly engages projection 64 formed in rail 49. Connection is made at the opposite end by engagement of rail 70 over step 46B on a similar module support 45B. Rail 70 fits over rail 49B and slot 65 snappingly engages projection 64B on module support 45B. Although only one such projection and slot are shown, it is understood that projections and slots on the opposite side of each end, although not visible, also become engaged in the assembly process.

Figure 2:
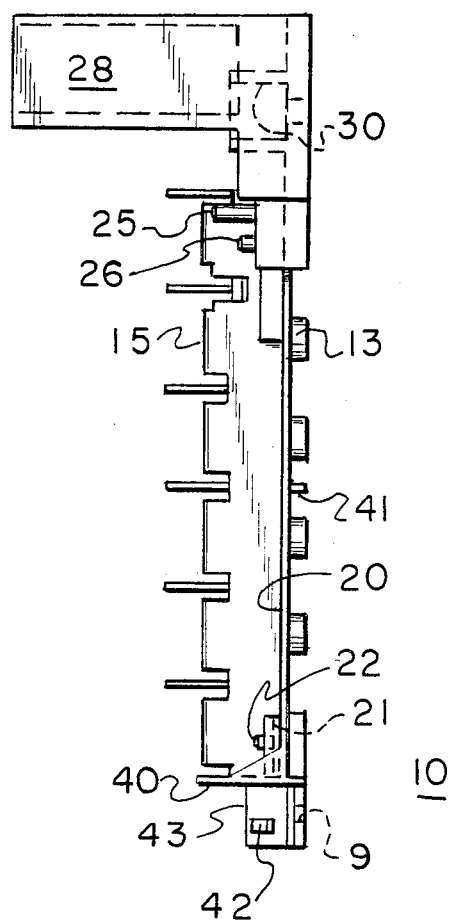
FIG. 2 is a side view of the support saddle of FIG. 1.

Referring back to FIG. 3, the modular extension 44 is shown similar to the plastic saddle of FIGS. 1 and 2 in that similar planar surfaces 54, 55 are formed within the module support 45 for receiving the power busses when positioned over the integrally formed support posts 57 and to which the circuit breaker mounting stabs (not shown) are attached by insertion of screws down within the circular recesses 58 formed within the support. A bus support platform 59 containing the circuit breaker stab support posts 60-62 cooperate to maintain and support the circuit breaker stabs in a manner similar to that described earlier with reference to FIGS. 1 and 2. A pair of extensions 51 and 52 are integrally formed on either side of the module support and contain slots 53 for the insertion of screws for attachment to the load center or panel board bottom pan or enclosure.

It is thus shown that an inexpensive thermoplastic saddle having integral circuit breaker, power bus and neutral terminal support means formed thereon can be utilized within a completely automated assembly process in view of the down-loaded assembly of components. A large number of circuit breakers for any size load center or panel board design can be provided by means of auxiliary extension modules having double-ended facility for attachment to a main circuit breaker saddle or to another extension module in a down-loaded serial arrangement.

Having described our invention, what I claim as new and desire to secure by Letters Patent is:

1. A circuit breaker support saddle comprising:
 a one-piece first molded plastic support member having first linear parallel surfaces for supporting circuit breaker power bus conductors and at least one additional linear parallel surface outboard of said first linear parallel surfaces for supporting neutral terminal conductors;
 a support post at one end of each said at least one additional linear parallel surface for receiving openings through said neutral terminal conductors for fastening said neutral terminal conductors to said molded plastic member;
 a pair of tubular extensions integrally formed within said plastic member at one end for receiving fastening means for attaching said plastic member to a metal enclosure and for electrically isolating said fastening means from said power bus conductors;
 a plurality of circuit breaker support hooks integrally formed inboard of said at least one additional linear parallel surface for receiving a plurality of molded case circuit breakers in fixed relation between said circuit breaker power conductors and said neutral terminal conductors; and
 a pair of first inverted U-shaped plastic rails integrally formed within said plastic member and extending from said one end for receiving complimentary inverted auxiliary U-shaped rails integrally formed within one end of an auxiliary molded plastic member to provide added length to said first plastic member, said first plastic rails including a first projection or a first slot integrally formed on a side of each of said first rails snappingly engaging an auxiliary projection or an auxiliary slot integrally formed on a side of each of said auxiliary U-shaped rails.

2. The circuit breaker support saddle of claim 1 wherein said means on said first plastic member comprises a first projection or a first slot integrally formed on a side of each of said pair of first inverted U-shaped rails.

3. The circuit breaker support saddle of claim 1 further including circular recess means formed in a bottom of said linear parallel surfaces for receiving attachment means between said circuit breaker power bus conductors and a plurality of circuit breaker branch straps to provide electrical isolation between said attachment means and said metal enclosure.

4. The circuit breaker support saddle of claim 1 further including a step formed in said one end of said first plastic member for receiving said one end of said auxiliary plastic member, and for bringing auxiliary first linear parallel surfaces within said auxiliary plastic member into alignment with said first linear parallel surfaces.

5. The circuit breaker support saddle of claim 4 including a pair of support tabs extending from said step to provide additional support to said one end of said auxiliary plastic member.

6. The circuit breaker support saddle of claim 2 including a second projection or a second slot integrally formed on a side of each of said auxiliary member plastic inverted U-shaped rails for engaging with said first projection or slot formed within said pair of first inverted U-shaped rails.

7. The circuit breaker support saddle of claim 1 further including a step formed in an opposite end of said plastic member for receiving one end of auxiliary member to provide added length to said plastic member.

8. The circuit breaker support saddle of claim 6 wherein said second projection is formed at said one end of said auxiliary plastic member and said slot is formed at another end of said auxiliary plastic member opposite said one end.

9. The circuit breaker support saddle of claim 7 further including a pair of split posts integrally formed at an opposite end of said first plastic member for receiving slot means formed in an auxiliary modular adapter containing a main circuit breaker for attaching said modular adapter and said main circuit breaker to said first plastic member.

* * * * *